US012802522B2

(12) United States Patent
John et al.

(10) Patent No.: US 12,802,522 B2
(45) Date of Patent: Nov. 17, 2026

(54) DATA TRANSMISSION SYSTEMS AND METHODS FOR GAMING APPLICATIONS

(71) Applicant: Truist Bank, Charlotte, NC (US)

(72) Inventors: Michael Taylor John, San Francisco, CA (US); Daniel M. Wilson, Menlo Park, CA (US); Ilya Vikulin, St. Augustine, FL (US)

(73) Assignee: TRUIST BANK, Charlotte, NC (US)

(*) Notice: Subject to any disclaimer, the term of this patent is extended or adjusted under 35 U.S.C. 154(b) by 487 days.

(21) Appl. No.: 18/478,317

(22) Filed: Sep. 29, 2023

(65) Prior Publication Data

US 2025/0111738 A1 Apr. 3, 2025

(51) Int. Cl.
*G07F 17/32* (2006.01)
*G06N 7/01* (2023.01)
*H04L 9/32* (2006.01)

(52) U.S. Cl.
CPC ........... *G07F 17/3223* (2013.01); *G06N 7/01* (2023.01); *G07F 17/3237* (2013.01); *H04L 9/3247* (2013.01)

(58) Field of Classification Search
CPC ... G07F 17/3223; G07F 17/3237; G06N 7/01; H04L 9/3247
See application file for complete search history.

(56) References Cited

U.S. PATENT DOCUMENTS 7,785,183 B1 * 8/2010 Stockham ........... G07F 17/3258 463/13
2003/0125100 A1 7/2003 Cannon
2005/0232421 A1 * 10/2005 Simons ................... H04L 63/12 380/255
2005/0266919 A1 * 12/2005 Rowe .................. G07F 17/3251 463/25
2007/0298875 A1 * 12/2007 Baerlocher ......... G07F 17/3258 463/27
2010/0299617 A1 * 11/2010 Fischer .................. G06Q 10/10 715/753
2015/0302482 A1 * 10/2015 Vagner ............... G06Q 30/0269 705/14.66
2021/0134110 A1 * 5/2021 Irwin, Jr. ................ G06F 21/31
2021/0183199 A1 * 6/2021 Uss ..................... G07F 17/3213

* cited by examiner

*Primary Examiner* — Werner G Garner
(74) *Attorney, Agent, or Firm* — Michael A. Springs, Esq.; Shumaker, Loop & Kendrick, LLP; Patrick B. Horne

(57) ABSTRACT

Systems and methods receive an input that triggers a request for a random numeric output associated with an outcome that indicates whether resource(s) are distributed to a player account of a player of a gaming application, and transmit the request for generation of the random numeric output to a third party server, the request indicating parameter(s) configured to influence the random numeric output and including data indicating weighted variables used to influence the outcome. A digitally signed electronic output file including the random numeric output is received, the digitally signed electronic output file being encrypted and including a stamp of authentication thereby cryptographically binding an electronic identity to the random numeric output. Key(s) stored to a key index are accessed and the digitally signed electronic output file is verified using the key(s). The random numeric output is authenticated and applied to a promotional draw to determine the outcome.

18 Claims, 7 Drawing Sheets

DATA TRANSMISSION SYSTEMS AND METHODS FOR GAMING APPLICATIONS

FIELD OF THE INVENTION

This invention relates generally to the field of gaming systems, and more particularly embodiments of the invention relate to gaming systems for obtaining random numeric inputs.

BACKGROUND OF THE INVENTION

The gaming industry continually seeks to provide greater confidence to game participants that winners are selected at random and that the games are unbiased. Automatic number generators are often utilized in order to provide a random and unbiased selection process in order to provide fairness and transparency in games of chance. Automatic number generation utilizes algorithms designed to eliminate manipulation or bias in order to provide credibility to a game of chance such as a sweepstakes. However, existing systems that rely on automatic number generators have various shortcomings that can impact organizational integration, and having established protocols and processes in place would provide participants with confidence in the legitimacy of the process. Thus, a need exists for improved systems for obtaining random numeric inputs.

BRIEF SUMMARY

Shortcomings of the prior art are overcome and additional advantages are provided through the provision of a computing system for cryptographic data transmission, where the computing system includes at least one processor, a communication interface communicatively coupled to the at least one processor, and a memory device storing executable code. When executed, the executable code causes the at least one processor to receive, at an entity server, an input from a player device that triggers a request for generation of a random numeric output associated with an outcome, wherein the outcome indicates whether one or more resources are to be distributed to a player account of a player of a gaming application that is accessible to the player via the player device. The request for generation of the random numeric output is transmitted across a network to a third party server, the request indicating one or more parameters configured to influence the random numeric output and including data indicating weighted variables used to influence the outcome. A digitally signed electronic output file comprising the random numeric output is received via the network from the third party server, where the digitally signed electronic output file is encrypted and includes a stamp of authentication thereby cryptographically binding an electronic identity to the random numeric output. One or more keys stored to a key index are accessed and the digitally signed electronic output file is verified as being unaltered, where the verifying uses the accessed one or more stored keys thereby authenticating the random numeric output. The random numeric output is applied to a promotional draw to determine the outcome, and one or more resources are distributed to the player account based on the outcome.

Additionally, disclosed herein is a computing system for variable assignment. The computing system includes at least one processor, a communication interface communicatively coupled to the at least one processor, and a memory device storing executable code that when executed, causes the at least one processor to assign weighted values to the probability classification data based on the classifications assigned to the probability classification data, the weighted values configured to influence probability of an outcome based on classification of the user data, wherein the outcome indicates whether one or more resources are to be distributed. An entity server of the entity receives an input from a player device of a player of the gaming application that triggers a request for generation of a random numeric output associated with the outcome and based thereon identifies a user profile of the player, the user profile including associated player data of the player. Based on player variables included in the player data, the player data of the player is classified to a specific classification of the classifications. The request for generation of the random numeric output is transmitted, across a network, to a third party server, the request indicating one or more parameters configured to influence the random numeric output and including the probability classification data of the specific classification to which the player data was classified.

Also disclosed herein is a computer-implemented method for cryptographic data transmission, where the method includes receiving, at an entity server, an input from a player device that triggers a request for generation of a random numeric output associated with an outcome, wherein the outcome indicates whether one or more resources are to be distributed to a player account of a player of a gaming application that is accessible to the player via the player device. The method also includes transmitting, across a network, the request for generation of the random numeric output to a third party server, the request indicating one or more parameters configured to influence the random numeric output and including data indicating weighted variables used to influence the outcome. Further, a digitally signed electronic output file comprising the random numeric output is received via the network from the third party server, where the digitally signed electronic output file is encrypted and includes a stamp of authentication thereby cryptographically binding an electronic identity to the random numeric output. One or more keys stored to a key index are accessed and used to verify that the digitally signed electronic output file is unaltered thereby authenticating the random numeric output. The method includes applying the random numeric output to a promotional draw to determine the outcome, and one or more resources are distributed to the player account based on the outcome.

The features, functions, and advantages that have been described herein may be achieved independently in various embodiments of the present invention including computer-implemented methods, computer program products, and computing systems or may be combined in yet other embodiments, further details of which can be seen with reference to the following description and drawings.

BRIEF DESCRIPTION

One or more aspects are particularly pointed out and distinctly claimed as examples in the claims at the conclusion of the specification. The foregoing as well as objects, features, and advantages of one or more aspects are apparent from the following detailed description taken in conjunction with the accompanying drawings in which:

DETAILED DESCRIPTION

Figure 1:
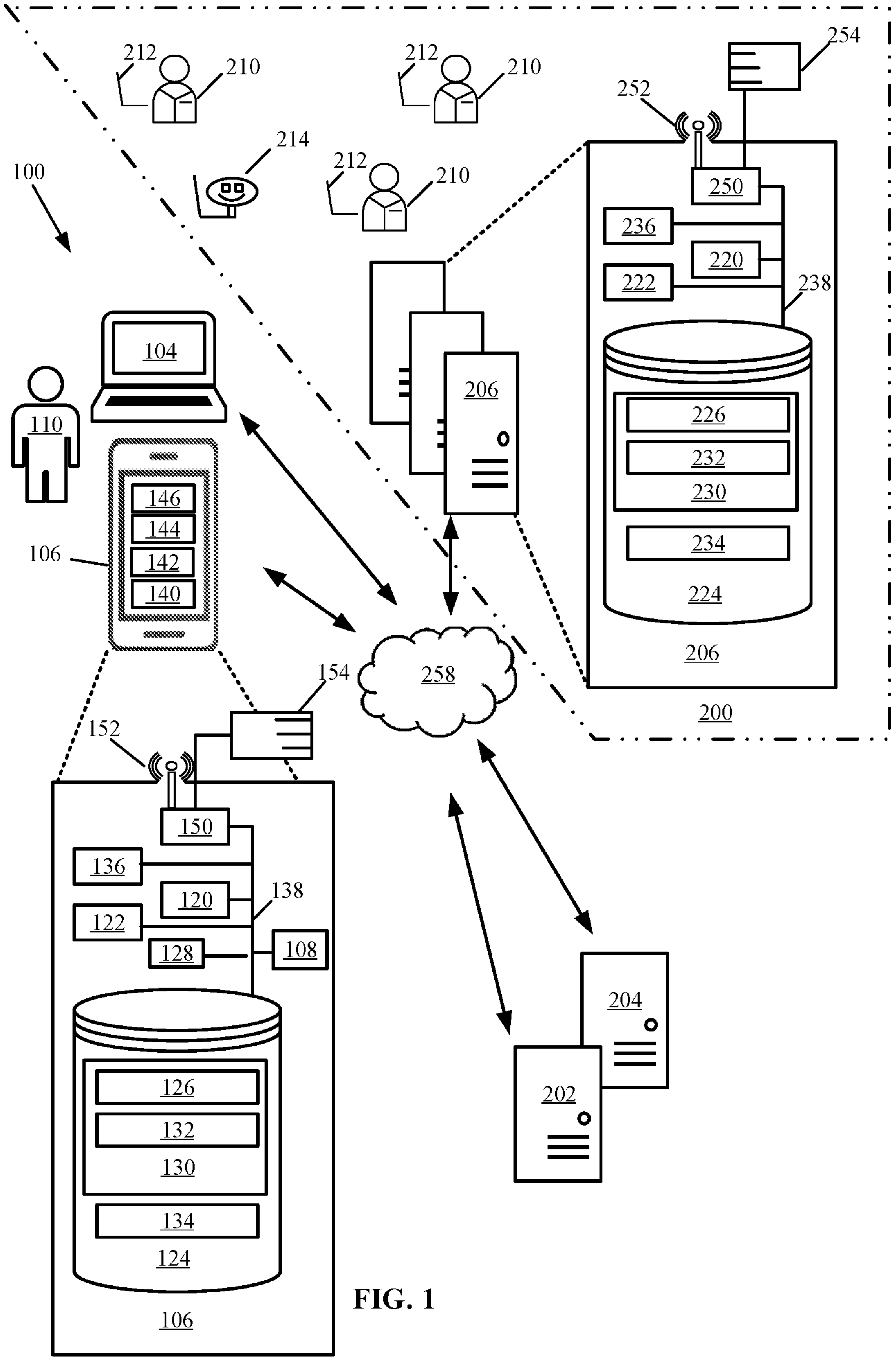
FIG. 1 illustrates a computing environment that includes a system for obtaining random numeric inputs, in accordance with an embodiment of the present invention.

Aspects of the present invention and certain features, advantages, and details thereof are explained more fully below with reference to the non-limiting examples illustrated in the accompanying drawings. It is to be understood that the disclosed embodiments are merely illustrative of the present invention and the invention may take various forms. Further, the figures are not necessarily drawn to scale, as some features may be exaggerated to show details of particular components. Thus, specific structural and functional details illustrated herein are not to be interpreted as limiting, but merely as a representative basis for teaching one skilled in the art to employ the present invention.

Descriptions of well-known processing techniques, systems, components, etc. are omitted to not unnecessarily obscure the invention in detail. It should be understood that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular embodiment of the concepts disclosed herein.

The specification may include references to "one embodiment," "an embodiment," "various embodiments," "one or more embodiments," etc. may indicate that the embodiment(s) described may include a particular feature, structure or characteristic, but every embodiment may not necessarily include the particular feature, structure, or characteristic. In some cases, such phrases are not necessarily referencing the same embodiment. When a particular feature, structure, or characteristic is described in connection with an embodiment, such description can be combined with features, structures, or characteristics described in connection with other embodiments, regardless of whether such combinations are explicitly described. Thus, unless described or implied as exclusive alternatives, features throughout the drawings and descriptions should be taken as cumulative, such that features expressly associated with some particular embodiments can be combined with other embodiments.

The terminology used herein is for the purpose of describing particular embodiments only and is not intended to be limiting of the invention. As used herein, the singular forms "a." "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method, step of a method, device or element of a device that "comprises," "has," "includes," or "contains," or uses similar language to describe one or more steps or elements possesses those one or more steps or elements, but is not limited to possessing only those one or more steps or elements. Furthermore, a device or structure that is configured in a certain way is configured in at least that way, but may also be configured in ways that are not listed.

Like numbers refer to like elements throughout. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "couple," "coupled," "connected," and the like should be broadly understood to refer to connecting two or more elements or signals electrically and/or mechanically, either directly or indirectly through intervening circuitry and/or elements. Two or more electrical elements may be electrically coupled, either direct or indirectly, but not be mechanically coupled; two or more mechanical elements may be mechanically coupled, either direct or indirectly, but not be electrically coupled; two or more electrical elements may be mechanically coupled, directly or indirectly, but not be electrically coupled. Coupling (whether only mechanical, only electrical, or both) may be for any length of time, e.g., permanent or semi-permanent or only for an instant. "Communicatively coupled to" and "operatively coupled to" can refer to physically and/or electrically related components.

In addition, as used herein, the terms "about," "approximately," or "substantially" for any numerical values or ranges indicate a suitable dimensional tolerance that allows the device, part, or collection of components to function for its intended purpose as described herein.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

Additionally, illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

As understood by one skilled in the art, program code can include both software and hardware. For example, program code in certain embodiments of the present invention can include fixed function hardware, while other embodiments can utilize a software-based implementation of the functionality described. Certain embodiments combine both types of program code.

As used herein, the terms "enterprise" or "provider" generally describes a person or business enterprise (e.g., company, organization, institution, business, university, etc.) that hosts, maintains, or uses computer systems that provide functionality for the disclosed systems and methods. In particular, the term "enterprise" may generally describe a person or business enterprise providing goods and/or services. Interactions between an enterprise system and a user device can be implemented as an interaction between a computing system of the enterprise and a user device of a user. For instance, user(s) may provide various inputs that can be interpreted and analyzed using processing systems of the user device and/or processing systems of the enterprise system. Further the enterprise computing system and the user device may be in communication via a network. According to various embodiments, the enterprise system and/or user device(s) may also be in communication with an external or third-party server of a third party system that may be used to perform one or more server operations. In some embodiments, the functions of one illustrated system or server may be provided by multiple systems, servers, or computing devices, including those physically located at a central computer processing facility and/or those physically located at remote locations.

Embodiments of the present invention are described herein with reference to flowchart illustrations and/or block diagrams of computer-implemented method(s) and computing system(s). Each block or combinations of blocks of the flowchart illustrations and/or block diagrams can be implemented by computer readable program instructions or code that may be provided to a processor of a general purpose computer, special purpose computer, programmable data processing apparatus or apparatuses (the term "apparatus" includes systems and computer program products), and/or other device(s). In particular, the computer readable program instructions, which can be executed via the processor of the computer, programmable data processing apparatus, and/or other device(s), create a means for implementing the functions/acts specified in the flowchart and/or block diagram block(s).

In one embodiment, computer readable program instructions may also be stored in one or more computer-readable storage media that can direct a computer, programmable data processing apparatus, and/or other device(s) to function in a particular manner such that a computer readable storage medium of the one or more computer-readable storage media having instructions stored therein comprises an article of manufacture that includes the computer readable program instructions, which implement aspects of the actions specified in the flowchart illustrations and/or block diagrams. In particular, the computer-readable program instructions may be used to produce a computer-implemented method by executing the instructions to implement the actions specified in the flowchart illustrations and/or block diagram block(s). Additionally or alternatively, these computer program instructions may be stored in a computer-readable memory that can direct a computer, programmable data processing apparatus, and/or other device(s) to function in a particular manner such that the instructions stored in the computer readable memory produce an article of manufacture that includes the computer readable program instructions, which implement the function/act specified in the flowchart and/or block diagram block(s). In some embodiments, computer-implemented steps/acts may be performed in combination with operator/human implemented steps/acts in order to carry out an embodiment of the invention.

In the flowchart illustrations and/or block diagrams disclosed herein, each block in the flowchart/diagrams may represent a module, segment, a specific instruction/function or portion of instructions/functions, and incorporates one or more executable computer readable program instructions for implementing the specified logical function(s). Similarly, alternative implementations and processes may also incorporate various blocks of the flowcharts and block diagrams. For instance, in some implementations the functions noted in the blocks may occur out of the order noted in the figures. For example, two blocks shown in succession may be executed substantially concurrently, and/or the functions of the blocks may sometimes be executed in the reverse order, depending upon the functionality involved.

FIG. 1 illustrates a computing environment 100 that includes a system for obtaining random numeric inputs, according to at least one embodiment of the present invention. The computing environment 100 generally includes a user 110 (e.g., customer of the enterprise) that benefits through use of services and products offered by an enterprise system 200. Use of the words "service(s)" or "product(s)" as used herein can be interchangeable. The user 110 can be an individual, a group, or any entity in possession of or having access to the user device 104, 106, which may be personal, enterprise, or public items. Although the user 110 may be singly represented in some figures, in at least in some embodiments the user 110 is one of many such that a market or community of users, consumers, customers, business entities, government entities, clubs, and groups of any size.

The computing environment 100 may include, for example, a distributed cloud computing environment (private cloud, public cloud, community cloud, and/or hybrid cloud), an on-premise environment, fog-computing environment, and/or an edge-computing environment. The user 110 accesses services and products of the enterprise system 200 by use of one or more user devices, illustrated in separate examples as user devices 104, 106. Example user devices 104, 106 may include a laptop, desktop computer, tablet, a mobile computing device such as a smart phone, a portable digital assistant (PDA), a pager, a mobile television, a gaming device, an audio/video player, a virtual assistant device or other smart home device, a wireless personal response device, or any combination of the aforementioned, or other portable device with processing and communication capabilities.

In the illustrated example, the mobile device 106 is illustrated in FIG. 1 as having exemplary elements, the below descriptions of which apply as well to the computing device 104. The user device 104, 106 can include integrated software applications that manage device resources, generate user interfaces, accept user inputs, and facilitate communications with other devices among other functions. The integrated software applications can include an operating system, such as Linux®, UNIX®, Windows®, macOS®, iOS®, Android®, or other operating system compatible with personal computing devices. Furthermore, the user device

104, 106 may be and/or include a workstation, a server, a set of servers, a cloud-based application or system, or any other suitable system or device adapted to execute any suitable operating system used on personal computers, central computing systems, phones, and/or other devices.

The user device 104, 106, but as illustrated with specific reference to the mobile device 106, includes at least one of each of a processor 120, and a memory device 122 for processing use, such as random access memory (RAM), and read-only memory (ROM), and other various components. The illustrated mobile device 106 further includes a storage device 124 including at least one of a non-transitory storage medium, such as a microdrive, for long-term, intermediate-term, and short-term storage of computer-readable program instructions 126 for execution by the processor 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and/or other data items preferred by the user or otherwise required or related to any or all of the applications or programs 130.

The memory device 122 is operatively coupled to the processor 120. As used herein, memory device 122 includes store any computer readable medium configured to store data, code, and/or other information. The memory device 122 may include volatile memory, such as volatile Random Access Memory (RAM), and/or a cache area for the temporary storage of data. The memory device 122 may also include non-volatile memory and may be embedded and/or may be removable. The non-volatile memory additionally or alternatively can include an electrically erasable programmable read-only memory (EEPROM), flash memory, or the like.

According to various embodiments, the memory device 122 and storage device 124 may be combined into a single storage medium. The memory device 122 and storage device 124 can store any of a number of applications that comprise computer-executable program instructions or code executed by the processing device 120 to implement, via the user device 104, 106, the functions described herein. For example, the memory device 122 may store applications and/or association data related to a conventional web browser application and/or an enterprise-distributed application (e.g., a mobile application). These applications also typically provide a graphical user interface (GUI) that is displayed via the display 140 that allows the user 110 to perform functions via the application including to communicate, via the user device 104, 106 with the enterprise system 200, and/or other devices or systems. The GUI on the display 140 may include features for displaying information and accepting inputs from users, and may include input controls such as fillable text boxes, data fields, hyperlinks, pull down menus, check boxes, and the like.

In various embodiments, the user 110 may download, sign into, or otherwise access the application from an enterprise system 200 or from a distinct application server. In other embodiments, the user 110 interacts with the enterprise system 200 via a web browser application in addition to, or instead of, the downloadable version of the application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 may also include the functionality to encode and interleave messages and data prior to modulation and transmission. The processing device 120 can additionally include an internal data modem to convert data from digital format to a format suitable for analog transmission. Further, the processing device 120 may include functionality to operate one or more software programs, which may be stored in the memory device 122 or in the storage device 124. For example, the processing device 120 may be capable of operating a connectivity program such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information and data that are used by the user device 104, 106 as well as the applications and devices that facilitate functions of the user device 104, 106, or that are in communication with the user device 104, 106, to implement the functions described herein, and other functions not expressly described. For example, the storage device 124 may include user authentication information data as well as other data.

The processing device 120, in various examples, can operatively perform calculations, can process instructions for execution, and can manipulate information. The processing device 120 can execute machine-executable program instructions stored in the storage device 124 and/or memory device 122 to perform the methods and functions as described or implied herein. Specifically, the processing device 120 can execute machine-executable instructions to perform actions as expressly provided in one or more corresponding flow charts and/or block diagrams or as would be impliedly understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, one or more user input devices and/or one or more user output devices, which are operatively coupled to the processing device 120. The input and output system 136 may include input/output circuitry that may operatively convert analog signals and other signals into digital data, or may convert digital data to another type of signal. For example, the input/output circuitry may receive and convert physical contact inputs, physical movements, or auditory signals (e.g., which may be used to authenticate a user) to digital data. Once converted, the digital data may be provided to and processed by the processing device 120. The input and output system 136 may also include a display 140 (e.g., a liquid crystal display (LCD), light emitting diode (LED) display, or the like), which can be, as a non-limiting example, a presence-sensitive input screen (e.g., touch screen or the like) of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices may include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, infrared sensor, and/or other input device(s). The input and output system 136 may also include a camera 146, such as a digital camera.

Non-limiting examples of input devices and/or output devices of the input and output system 136 may include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and the enterprise system 200.

In some embodiments, a credentialed system enabling authentication of a user may be necessary in order to provide access to the enterprise system 200. In one embodiment, the input and output system 136 may be configured to obtain and process various forms of authentication to authenticate a user 110 prior to providing access to the enterprise system 200. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems.

The user device, referring to either or both of the computing device 104 and the mobile device 106 may also include a positioning device 108, which can be for example a global positioning System (GPS) transceiver configured to be used by a positioning system to determine a location of the computing device 104 or mobile device 106. In some embodiments, the positioning system device 108 includes an antenna, transmitter, and receiver. In one embodiment, triangulation of cellular signals may be used to identify the approximate location of the mobile device 106. In other embodiments, the positioning device 108 includes a proximity sensor or transmitter, such as a radio-frequency identification (RFID) tag, that can sense or be sensed by devices known to be located proximate a merchant or other location to determine that the consumer mobile device 106 is located proximate these known devices.

In the illustrated example, a system intraconnect 138 (e.g., system bus), electrically connects the various described, illustrated, and implied components of the mobile device 106. The intraconnect 138, in various non-limiting examples, can include or represent, a system bus, a high-speed interface connecting the processing device 120 to the memory device 122, providing electrical connections among the components of the mobile device 106, and may include electrical conductive traces on a motherboard common to some or all of the above-described components of the user device (referring to either or both of the computing device 104 and the mobile device 106). As discussed herein, the system intraconnect 138 may operatively couple various components with one another, or in other words, electrically connects those components either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide wired (e.g., via wired or docked communication by electrically conductive connector 154) or wireless (e.g., via wireless communication device 152) two-way communications and data exchange. Communications may be conducted via various modes or protocols, of which global system for mobile communication (GSM) voice calls, short message service (SMS), enterprise messaging service (EMS), multimedia messaging service (MMS) messaging, TDMA, code division multiple access (CDMA), PDC, WCDMA, CDMA2000, and GPRS, are all non-limiting and non-exclusive examples. Wireless communications may be conducted via the wireless communication device 152, which can include, as non-limiting examples, a radio-frequency transceiver, a Bluetooth device, Wi-Fi device, a Near-field communication device, and other transceivers. In addition, GPS connections may be included for ingoing and/or outgoing navigation and location-related data exchanges. Wired communications may be conducted, e.g., via the connector 154, by USB, Ethernet, and/or other physically connected modes of data transfer.

The processing device 120 may, for example, be configured to use the communication interface 150 as a network interface to communicate with one or more other devices on a network. In this regard, the communication interface 150 utilizes the wireless communication device 152 such as an antenna operatively coupled to a transmitter and a receiver (or together a "transceiver") included with the communication interface 150. The processing device 120 is configured to provide signals to and receive signals from the transmitter and receiver, respectively. In various embodiments, the signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, and/or fifth-generation communication protocols and/or the like. For example, the mobile device 106 may be configured to operate in accordance with second-generation (2G) wireless communication protocols IS-136 (time division multiple access (TDMA)), GSM, and/or IS-95 CDMA, with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), with fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

The computing environment 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may be utilized. In some implementations, a single system or server may provide the functions of one or more systems, servers, or illustrated components. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging. TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, near-field communication device, and other transceivers. In addition, GPS may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, IOS, Android, and any known other operating system used on personal computer, central computing systems, phones, and other devices.

The user devices, referring to either or both of the computing device 104 and mobile device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

The network 258 may incorporate a cloud platform/data center that support various service models including Platform as a Service (PaaS), Infrastructure-as-a-Service (IaaS), and Software-as-a-Service (SaaS). Such service models may provide, for example, a digital platform accessible to the user device (referring to either or both of the computing device 104 and the mobile device 106). Specifically, SaaS may provide a user with the capability to use applications running on a cloud infrastructure, where the applications are accessible via a thin client interface such as a web browser and the user is not permitted to manage or control the underlying cloud infrastructure (i.e., network, servers, operating systems, storage, or specific application capabilities that are not user-specific). PaaS also do not permit the user to manage or control the underlying cloud infrastructure, but this service may enable a user to deploy user-created or acquired applications onto the cloud infrastructure using programming languages and tools provided by the provider of the application. In contrast, IaaS provides a user the permission to provision processing, storage, networks, and other computing resources as well as run arbitrary software (e.g., operating systems and applications) thereby giving the user control over operating systems, storage, deployed applications, and potentially select networking components (e.g., host firewalls).

The network 258 may also incorporate various cloud-based deployment models including private cloud (i.e., an organization-based cloud managed by either the organization or third parties and hosted on-premises or off premises), public cloud (i.e., cloud-based infrastructure available to the general public that is owned by an organization that sells cloud services), community cloud (i.e., cloud-based infrastructure shared by several organizations and manages by the organizations or third parties and hosted on-premises or off premises), and/or hybrid cloud (i.e., composed of two or more clouds e.g., private community, and/or public).

Two external systems 202 and 204 are expressly illustrated in FIG. 1, representing any number and variety of data sources, users, consumers, customers, business entities, systems, entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes. The enterprise system 200 may communicate with the external system 202, 204 using any combination of public or private communication.

In certain embodiments, one or more of the systems such as the user device (referring to either or both of the computing device 104 and the mobile device 106), the enterprise system 200, and/or the external systems 202 and 204 are, include, or utilize virtual resources. In some cases, such virtual resources are considered cloud resources or virtual machines. The cloud computing configuration may provide an infrastructure that includes a network of interconnected nodes and provides stateless, low coupling, modularity, and semantic interoperability. Such interconnected nodes may incorporate a computer system that includes one or more processors, a memory, and a bus that couples various system components (e.g., the memory) to the processor. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

According to one embodiment, a user 110 may initiate an interaction with the enterprise system 200 via the user device 104, 106 and based thereon the enterprise system 200 may transmit, across a network 258, to the user device 104, 106 digital communication(s). In order to initiate the interaction, the user 110 may select, via display 140, a mobile application icon of a computing platform of the enterprise system 200, login via a website to the computing platform of the enterprise system 200, or perform various other actions using the user device 104, 106 to initiate the interaction with the enterprise system 200. In other embodiments, the enterprise system 200 may initiate the interaction with the user 110 via the user device 104, 106. For instance, periodically the enterprise system 200 may transmit unprompted communication(s) such as a short message service (SMS) text message, multimedia message (MMS), or other messages to the user device 104, 106 that includes an embedded link, a web address (e.g., a uniform resource locator (URL)), a scannable code (e.g., a quick response (QR) code, barcode, etc.) to prompt the user 110 to interact with the enterprise system 200.

Once an interaction has been established between the enterprise system 200 and the user device 104, 106, data and/or other information may be exchanged via data transmission or communication in the form of a digital bit stream or a digitized analog signal that is transmitted across the network 258. Based on the user 110 of the user device 104, 106 providing one or more user inputs (e.g., via the user interface, via a speech signal processing system, etc.) data may be received by the enterprise system 200 and data processing is performed thereon using, for example, processing device 220. This received data may then be stored to the storage device 224 or to a third party storage resource such as, for example, external systems 202, 204, which may include a cloud storage service or remote database. Additionally, this collected response data may be aggregated in order to allow the enterprise to have a sampling of responses from multiple users 110. Such aggregated data may be accessible by a relational database management system (e.g., Microsoft SQL server, Oracle Database, MySQL, PostgreSQL, IBM Db2, Microsoft Access, SQLite, MariaDB, Snowflake, Microsoft Azure SQL Database, Apache Hive, Teradata Vantage, etc.) or other software system that enables users to define, create, maintain and control access to information stored by the storage device 224, database, and/or other external systems 202, 204. According to one embodiment, the relational database management system may maintain relational database(s) and may incorporate structured query language (SQL) for querying and updating the database. The relational database(s) may organize data into one or more tables or "relations" of columns (e.g., attributes) and rows (e.g., record), with a unique key identifying each row. According to various embodiments, each table may represent a user/customer profile and the various attributes and/or records may indicate attributes attributed to the user/customer.

For instance, the user/customer profiles may be classified based on various designations/classifiers such as their financial assets, income, bank account types, age, geographic region(s), etc. Each designation/classifier may also include a plurality of sub categories. Storing the collected data to the relational database of the relational database management system may facilitate sorting of the data to filter based on various categories and/or subcategories and/or performing data analytics thereon. According to some embodiments, the enterprise system 200 may utilize algorithms in order to categorize or otherwise classify the data.

The collected data may also have metadata associated therewith that can be accessed by the enterprise system 200. The metadata may include, for example, (i) sequencing data representing the data and time when the response data was created, (ii) modification data indicating the individual (such as user 110) that last modified specific information/data, (iii) weighting data representing the relative importance or magnitude of the attributes, (iv) provider identifier data identifying the owner of the data (e.g., the entity that operates the enterprise system 200), and/or (v) other types of data that could be helpful to the enterprise in order to classify and analyze the collected data.

According to one embodiment, the relational database(s) may store data associated with user/customer profiles in order to sync this data with a gaming functionality and/or application. In particular, the enterprise system 200 may include an enterprise mobile software application that includes a gaming functionality that may be installed on or otherwise accessed by the user device 104, 106. When the user 110 accesses the gaming functionality, the user 110 may be rewarded by performing various tasks. In particular, the user 110 may receive rewards for accomplishing various goals related to financial wellness. The gaming functionality may help the user develop smart financial habits with monetary rewards for developing these habits and is rooted in behavioral economics.

In general, the gaming application disclosed herein may operate via external systems 202, 204 and provides front-end functionalities that enable the user 110 to interact with games. In particular, the external systems 202, 204 may host the game server(s). In one embodiment, the external systems 202, 204 include Amazon Web Services (AWS), which provides a workflow for developing, deploying, and hosting the gaming application. Further, the games may incorporate user/customer profiles that may be linked to that specific user's/customer's profile that is stored within or otherwise associated with the enterprise system 200. By syncing the user/customer profile for the gaming application with the user/customer profile of the enterprise system 200, the gaming application can access information about the user 110 that is derived from the user/customer profile of the enterprise system 200. This enables the gaming application to utilize user/customer data in order to personalize the game in accordance with various enterprise objectives. In a non-limiting example, user/customer data stored by the enterprise system 200 that indicates current account balances may be accessed by the game server(s) of the external system 202, 204 in order to personalize the gaming experience for the user 110 by encouraging certain financial behaviors. Other external system 202, 204 may include promotional prize server(s) that can be configured to generate one or more random numeric outcomes based on one or more rules defining a win likelihood.

To perform various functionalities associated with the gaming application, the game server(s) may be configured to make an application programming interface (API) call to the prize server(s) to provide information necessary to generate a random numeric outcome. For instance, the API call may indicate a current game at a current level, and the prize server(s) process the information provided to generate a random number based on that information in accordance with various rules defining a win likelihood. The prize server(s) then provide results from the random number generator, which is used to determine a monetary reward in response to the actions performed by the user 110. In addition, the monetary rewards obtained as a result of performing various actions via the gaming application may be transferred to user/customer accounts identified by the user/customer profile of the enterprise.

Figure 2:
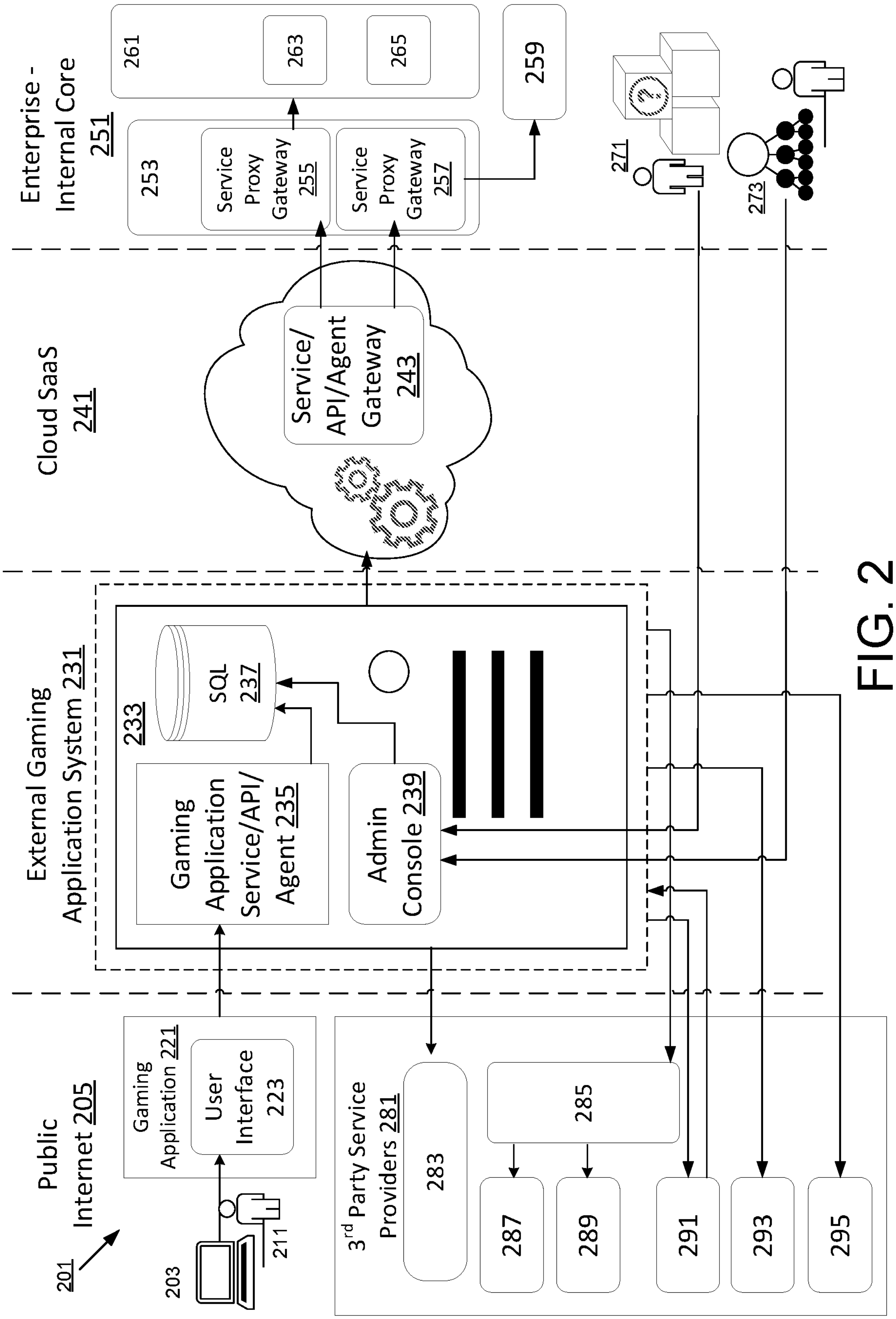
FIG. 2 depicts an example flow diagram for network communication associated with a gaming application, in accordance with an embodiment of the present invention.

FIG. 2 depicts an example flow diagram 201 for network communication associated with an external gaming application system 231, in accordance with an embodiment of the present invention. In particular, the flow diagram 201 depicts a user 211 providing one or more inputs, via a user device 203, to access the gaming application 221 across a public network 205 (e.g., public internet). The gaming application 221 includes a user interface 223 through which the user 211 interacts in order to play electronic game(s) (i.e., video game(s)). The game(s) may be played when the user 211 interacts via the user interface 223 and/or through other input device(s) (e.g., a joystick, controller, keyboard, motion sensing device, etc.). Inputs provided by the user 211 may generate visual feedback through a display of the user device 203.

The gaming application 221 is configured to communicate with an external gaming application system 231 that include server(s) 233 that are used to host the gaming application 221. Example cloud-based sever(s) 233 include, for example, AWS. The cloud-based server(s) 233 that host the gaming application 221 include the gaming application service/API/agent 235 that receives an API call from the gaming application 221. The API call utilizes a uniform resource identifier (URI), such as a URL, that identifies the cloud-based server(s) 233, incorporates the application layer protocol (e.g., the HTTP method) indicating the desired action to be performed by the service/API/agent 235 (e.g., the data to be extracted, the functionality to be performed, etc.), includes a header so that the service/API/agent 235 understands the request, and includes an API key or access token used by the service/API/agent 235 to authenticate the API call. The service/API/agent 235 accesses data from the relational database 237 (e.g., SQL database), which may include a collection of structured data needed for the gaming application 221 to integrate various features. The admin console 239 is used by support and developers to provide administrative functions (e.g., provide support for customers, check on the health of the external gaming application system, etc.).

The external gaming application system is integrated with a cloud SaaS 241, which is configured to receive API calls from the cloud-based server(s) 233 to access user data associated with a user profile of the user 211. In a non-limiting example, the user data includes information associated with financial services and products offered by the enterprise such as direct deposit information, current financial balance information, financial savings information, financial transaction history, etc.). The cloud SaaS 241 includes a service/API/agent gateway 243, which acts an edge gateway or network entry point for the enterprise—internal core system 251. The service/API/agent gateway 243 may provide, according to one embodiment, network translation between networks that use different protocols and may include routers, routing switches, multiplexers, etc. In one particular embodiment, the service/API/agent gateway 243 includes various permissions to perform calls to fetch the user data.

Retrieval of user data within the enterprise—internal core system 251 is facilitated by use of service proxy gateway(s) 255, 257 of the gateway platform 253. The gateway platform 253 is a multichannel API gateway configured to provide security, control, integration and optimized access to fetch user data. The service proxy gateway(s) 255, 257 are modules that receive the API requests and forward them to defined endpoints within the internal enterprise system 261. In particular, the service proxy gateway(s) 255, 257 facilitate load balancing, access filtering, caching, etc. The internal enterprise system 261 includes an API-powered business ecosystem that enables the enterprise to perform various backend services and business functionalities. The internal enterprise system 261 includes service/API/agent systems 263, 265 that can be used to access the user data from original data sources and used to facilitate payments from a holding account of the cloud-based server(s) 233 so that the financial payments can be transferred to deposit account(s) associated with the user profile of the user 211. According to various embodiments, the financial payments may be made according to a predefined schedule and/or in response to a request from the user 211. The enterprise—internal core system 251 also includes a digital identity and authentication system 259 that is used to authenticate the user 211 and link the user's gaming profile/account to their user profile associated with the enterprise. The enterprise-internal core system 251 is also used by support agents 271 to provide customer support, resolve customer inquiries, etc. Further, the enterprise—internal core system 251 is used by administrators 273 to provide administrative functions for the external gaming application system 231.

Various third-party service providers 281 are also integrated with the external gaming application system 231. One example third-party service provider includes a game operator system 283 that includes promotional prize server(s) that can be configured to generate one or more random numeric outcomes based on one or more rules defining a win likelihood. A communication provider 285 may provide digital communications such as electronic messages through a communications platform 287 and push notifications through an operating system 289. A marketing analysis platform 291 may be used to analyze the efficacy of various messaging and communications associated with the gaming application system 231 and can provide feedback that can be used by the gaming application system 231 to modify functionalities to align with enterprise objectives. For example, the marketing analysis platform 291 may be used for inbound marketing channel attribution and outbound marketing channel attribution so that the enterprise may determine how marketing tactics influence customer interactions. A monitoring system provider 293 may provide off-duty support to detect problems with the gaming application system 231 by using real-time monitoring. When a problem is detected, the monitoring system provider 293 distributes an alert so that the problem can be resolved. An analytics provider 295 may analyze ways in which users interact with the gaming application system 231 in order to perform user experience analysis. Various additional or alternative third-party service providers 281 may also be utilized according to various embodiments.

In other embodiments, the external gaming application 231 is not external to the enterprise internal core 251. Rather, a gaming application may be integrated within the enterprise internal core 251, which advantageously eliminates use of the cloud SaaS 241. In particular, cloud-based server(s) 233 that host the gaming application 221, such as those provided via AWS would still host the gaming application 221, but the application system would be integrated within the enterprise internal core 251. The processes and systems described herein are not limited to the example flow diagram 201, and various other network flow communications may alternatively be implemented that would facilitate access to the gaming application 221.

Enhanced organizational integration and data security will help organizations within the gaming industry to provide customers and consumers with greater confidence that outcomes and winners are selected at random and that the games are unbiased. It is critical that data being sent from one server to another is securely transmitted, unaltered, and not intercepted by an undesired intermediate source. The gaming industry benefits by being able to authenticate the source of the message and by verifying the security of the content, some of which can be achieved through cryptographic means through private keys that are used to encrypt and decrypt information. The disclosed systems utilize various cryptographic and authentication means to provide greater security and confidence to the consumer that the outcome is unbiased.

In the disclosed systems, an enterprise system incorporates one or more enterprise servers and operates and otherwise provides the external gaming application system 231, the cloud SaaS 241, and the enterprise internal core 251 acts as an intermediary between client device(s) (e.g., user device 203) and the third-party service providers 281. At least one of the third-party service providers 281 includes a game operator system 283 that includes promotional prize server (s) that can be configured to generate one or more random numeric outcomes based on one or more rules defining a win likelihood. The game operator system 283 can be adapted to generate random numeric output used to make a win determination for various games offered through the gaming application system 231. In various embodiments, the game operator system 283 includes a dedicated processor for use in secure network communications that can generate random numbers. In some embodiments, the random number generator includes a true random number generator (TRNG) or a hardware random number generator (HRNG) that uses an unpredicted physical variable rather than an algorithm. The TRNG or HRNG generate numbers as a function of the current value of a physical environment's attribute that is constantly changing in a manner that is practically impossible to model. For example, the TRNG or HRNG may use radioactive decay of isotopes, airwave static, or an extremely sensitive temperature reading inside a computer board, measuring atmospheric noise, thermal noise, and/or external electromagnetic and quantum phenomena to generate random numbers. In alternative embodiments, a hybrid TRNG/HRNG and pseudorandom number generator (PRNG) may be used that takes randomness derived from various naturally random sources when such sources able to satisfy demand, but relies on periodically re-seeded cryptographically secure PRNGs (CSPRNGs) when the TRNG/HRNG is overwhelmed.

Various anti-tampering devices or systems may be implemented to ensure that the number generator is secure. For example, an anti-tampering device may incorporate various sensors such as a heat sensor, magnetic sensor, photoelectric sensor, and/or a pressure sensor. Anti-tampering devices may also or alternatively include surge protectors, a permanent log/record of all changes to the physical environment, and/or notification processes to ensure that the automatic number generator is not modified.

In some embodiments, a private key is created to cryptographically secure messages using PRNG methods. In some embodiments, the private key such as a 1024-bit private key is used as a digital signature of the results of the random numeric output and is transmitted back to the gaming application system 231 using cryptographically secure means. Once a random numeric output is produced via the game operator system 283 and received by the gaming application system 231, the enterprise system may distribute one or more resources (e.g., virtual or real-world currency) to the player account based on the outcome. Advantageously, the disclosed systems may utilize unpredictable physical variables to generate random numbers and use cryptographic communication algorithms to transmit communications between the enterprise system and the random number generator system. The disclosed systems improve upon prior methods for integrating data security for providing random outcomes to users of gaming applications. Further, the combination of elements integrate the systems described herein into a practical application.

Another aspect of the disclosed systems authenticates requests from users to generate a random numeric output. Specifically, the authentication process determines a geographic location of a player using an identifier of the player device such as an Internet Protocol (IP) address, Wi-Fi and Bluetooth MAC addresses, RFID, Wi-Fi connection location, GPS, and/or GSM/CDMA cell IDs. In some examples, the enterprise system determines geographic location of the player/player device maps the IP address of the player device using an IP geolocation API. The principal communications protocol used to relay datagrams or packets across a network utilize the Internet Protocol Suite. Internet Protocol Version 4 (IPv4) and/or Internet Protocol Version 6 (IPv6) are the primary addressing methods and structures used across the Internet. The IP defines an addressing system by identifying hosts and providing location services that are used in routing. IP-based geolocation maps an IP address or media access control (MAC) address to a real-world geographic location of the player device that is connected to the Internet. According to various embodiment, the IP address data includes country, region, city, postal code, latitude, longitude, timezone, etc. to geolocate the player device. Authenticating the geographic location of the player is necessary to ensure that the player is eligible to receive one or more resources (e.g., virtual or real-world currency). In some instances, sweepstakes may only be open to residents of certain states and/or ages. In other examples, the sweepstakes may only be open to legal residents of the fifty United States and District of Columbia that are over the age of eighteen or the age of majority in their state of residence at the time of entry. Various IP geolocation databases may be used to verify the location of the player device. Advantageously, this process utilizes a particular machine that is integral to the systems described herein.

Another specific improvement of existing systems issues, via a player device, an electronic communication indicating results of a sweepstakes or other game of chance, which allows the enterprise to share information in real time in a standardized format. Such formats used to provide the electronic communication can include a push notification, a SMS text, an email notification, an in-application notification accessible during the player's engagement with the interactive application, and/or other forms of digital communications.

According to the systems described herein, there is an entry fee of points accumulated by a player of a game that would need to be expended in order to obtain prizes or rewards. According to one embodiment, there is an odds table that is influenced by the number of points accumulated by the player of the game. In different games of chance or sweepstakes, the entry fee can be different. For example, for sweepstakes with a higher potential payout the entry fee may be higher or, alternatively, more entries may be obtained from the entry fee. In some instances, the number of sweepstakes entries could be earned based on the entry fee earned by the user, whereas in other instances the points accumulated by the user could be submitted for into a lottery or other game of chance to earn an entry into the sweepstakes. For example, the ability to obtain a sweepstakes entry could itself be based on a game of chance, and the player may get lucky and earn multiple sweepstakes entries when they submit their points or they could be unlucky and not earn any sweepstakes entries. In some embodiments, the sweepstakes may be part of a mini game within a larger game playable by the gaming application. Each time a player enters a sweepstakes or performs a game of chance, there is a call from the entity's backend system to a third party system that maintains a random number generator. Each reward or outcome is based on its own odds table for that particular player, so the sweepstakes or game of chance may be tuned individually.

In some example embodiments, the player can submit a partial entry into a sweepstakes, for example, if there is a fee of 300 points per entry into a sweepstakes, but the player does not have 300 points, the player may be provided with an option of buying a partial entry into the sweepstakes. In that scenario, if the player has 100 points, then the player could pay the 100 points to enter the sweepstakes, but if that player were to win then they would only be eligible for ⅓ of the prize of the sweepstakes.

There may be various ways to earn points that would help the player be eligible to enter the sweepstakes or game of chance. For example, the player could use virtual resources (e.g., virtual currency) to perform 10 in-game actions/moves. Upon completion of the 10 in-game moves, the player may earn a certain number of points. Those points may be allocated based on the skill level employed by the player to perform the 10 in-game actions/moves, so players that are at a higher skill level may accumulate points faster than other players and thereby use those points to obtain more entries into the sweepstakes.

Figure 3:
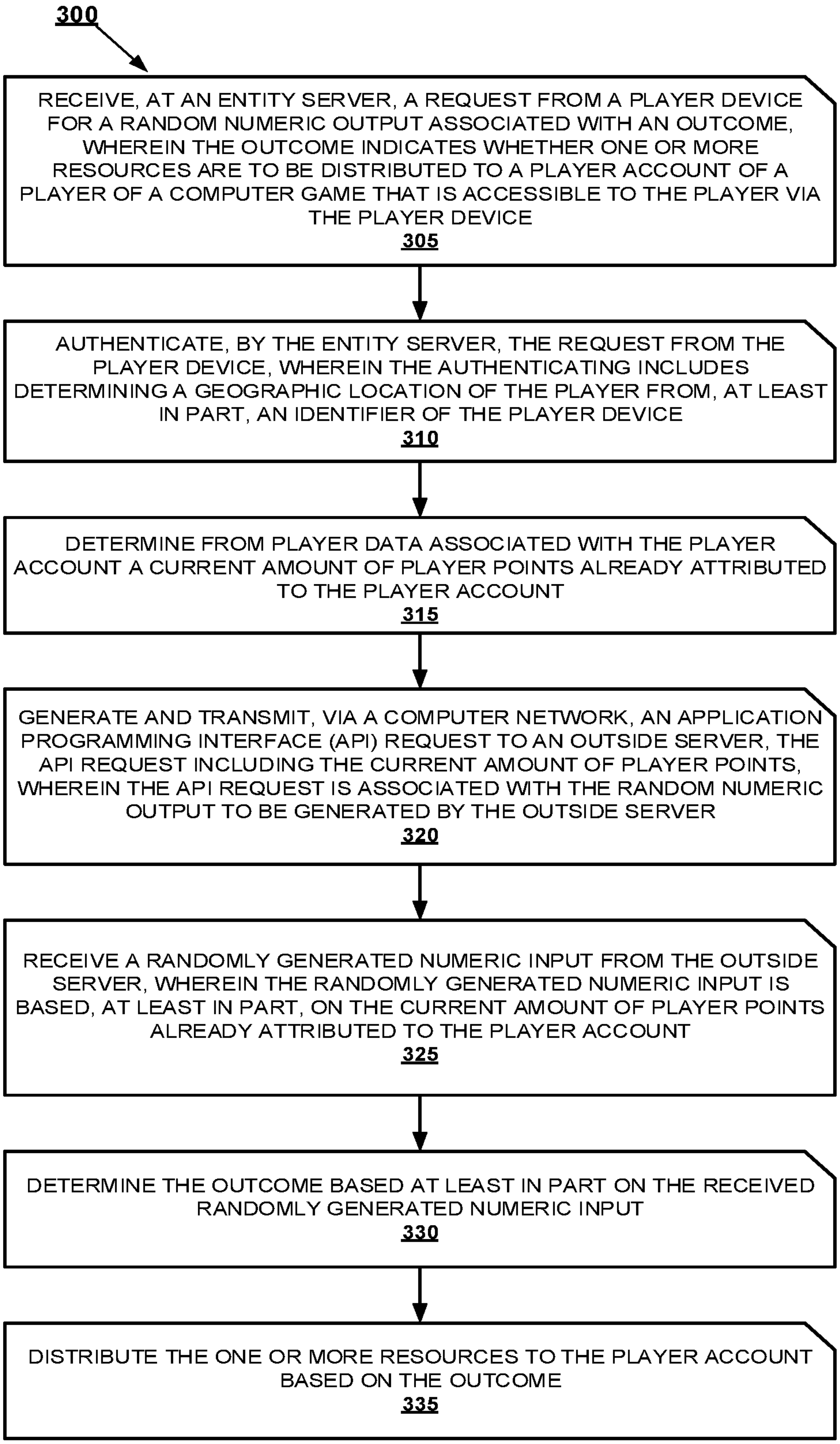
FIG. 3 depicts a block diagram of an example process flow for obtaining randomly generated numeric inputs, in accordance with an embodiment of the present invention.

FIG. 3 depicts a block diagram of an example process flow 300 for obtaining randomly generated numeric inputs, in accordance with an embodiment of the present invention. At block 305, an entity server of the enterprise system receives a request from a player device for a random numeric output associated with an outcome, where the outcome indicates whether one or more resources are to be distributed to a player account of a player of a computer game, or multiple computer games, accessible to the player via an interactive application that is accessed using the player device. According to various embodiments, the outcome includes a win determination. At block 310, the entity server authenticates the request from the player device, where the authenticating includes determining a geographic location of the player from, at least in part, an identifier of the player device. In some embodiments, the authenticating includes determining whether the geographic location of the player device includes a location in which a sweepstakes is permitted by comparing the geographic location to data of permitted locations. For example, a table may list or otherwise define permitted locations within which a player would be eligible to win the sweepstakes and the geographic location of the user may be identifier includes any one of an IP address, a Wi-Fi and Bluetooth MAC address, a RFID, a Wi-Fi connection location, GPS, and/or GSM/CDMA cell IDs. When the identifier includes an IP address, determining the geographic location of the player includes mapping the IP address of the player device using an IP geolocation API.

At block 315, the enterprise system determines from player data associated with the player account a current amount of player points or some other unit of measurement already attributed to the player account.

At block 320 an API request is generated and transmitted, via a computer network, to an outside server, where the API request includes the current amount of player points, and where the API request is associated with the random numeric output to be generated by the outside server. At block 325, a randomly generated numeric input is received from the outside server, where the randomly generated numeric input is based, at least in part, on the current amount of player points already attributed to the player account. For instance, players may earn points or some other unit of measurement by playing the computer game, and the current amount of player points include points accumulated by the player at least in part resulting from a reward for playing the computer game. As they earn points, they may increase the amount of entries or otherwise increase the odds that they win the sweepstakes or game of chance. According to various embodiments, the randomly generated numeric input is digitally signed via a private key in order to provide greater security and cryptographically protect the transmission of the randomly generated numeric input to prevent tampering or outside manipulation. The outcome is determined at block 330 at least in part on the received randomly generated numeric input. According to various embodiments, various other factors may further be used to determine the outcome. For example, the player's age, state of residence, the total reward available, and/or various other win probability rules of the computer game are used in the determination. Example win probability rules can be based on the number of entries, or there may be built-in biases that favor certain groups of individuals (e.g., based on customer loyalty).

At block 335, the one or more resources are distributed to the player account based on the outcome. According to various embodiments the one or more resources include virtual or currency rewards associated with a monetary value. In some embodiments, the resources are distributed to the player account, an alert is generated and transmitted to the player devices that indicates the outcome. For example, the alert may include an electronic communication selected from the group consisting of a push notification, a SMS text, an email notification, and an in-application notification accessible during the player's engagement with an interactive application. In one example, the alert notifies the player that the player won a sweepstakes and/or money and that the money will be deposited in a real-world financial account associated with the enterprise, assuming the enterprise is a financial institution. According to various embodiments, data indicating the randomly generated numeric input may be stored by a game operator system for auditing and transparency purposes to provide greater confidence that the outcomes are selected at random. Alternatively or additionally, the data indicating the randomly generated numeric input, the outcome, the resources distributed, and/or personally identifying player information linking to the player account of the player may be stored to a secure storage location of the entity associated with the entity server for later reference and analysis. In some embodiments, the player device may also or alternatively store this data.

Figure 4:
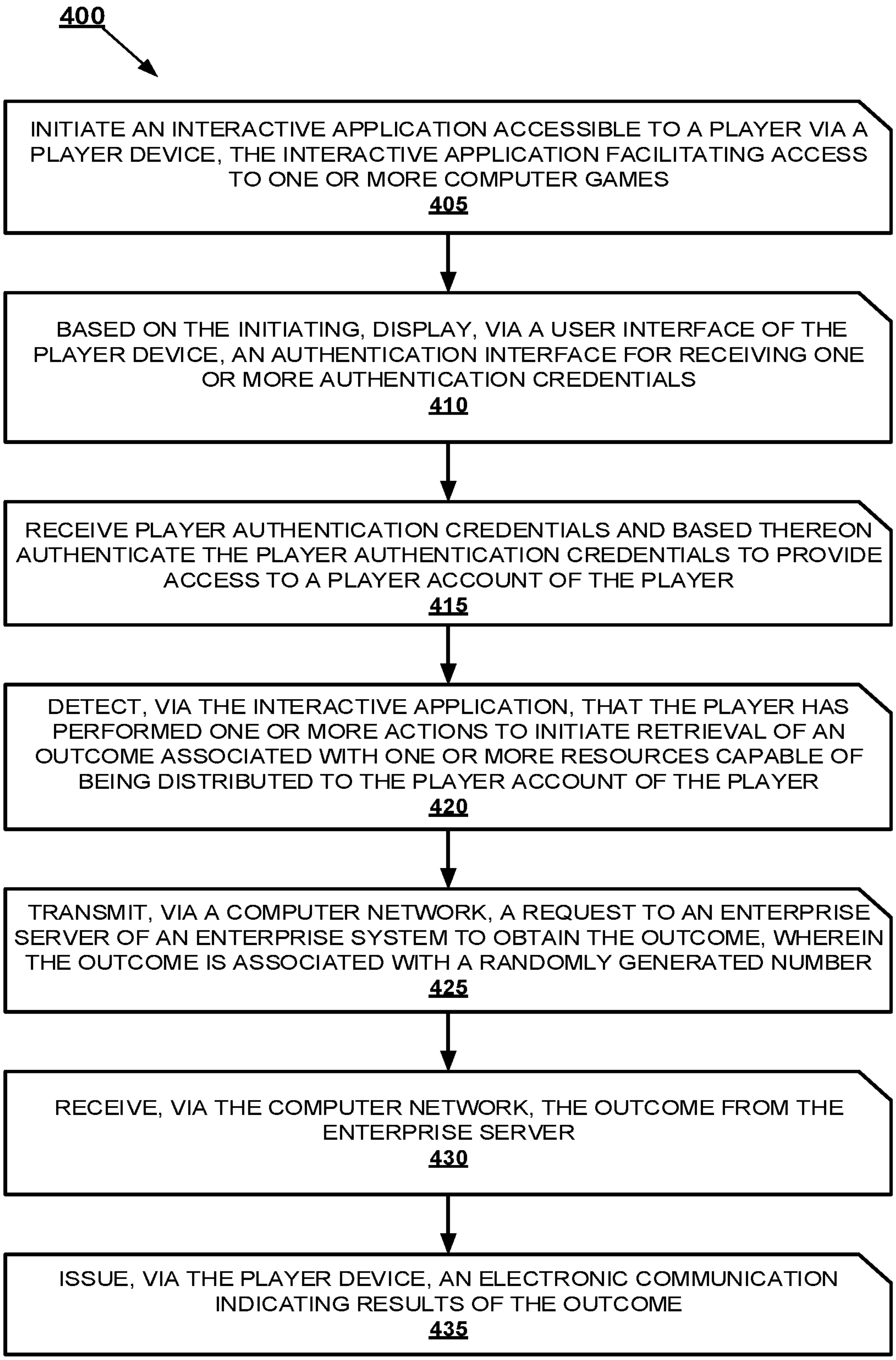
FIG. 4 depicts a block diagram of an example method for obtaining a randomly determined outcome, in accordance with an embodiment of the present invention.

FIG. 4 depicts a block diagram of an example method 400 for obtaining a randomly determined outcome, in accordance with an embodiment of the present invention. At block 405, an interactive application accessible to a player via a player device is initiated by the player device, where the interactive application is associated with an enterprise system. The interactive application, which may include a mobile application, facilitates access to one or more computer games. According to one embodiment, the interactive application may be designed to assist a player to improve their financial wellbeing by playing virtual games and achieving virtual or currency rewards. The computer games may allow the user to accumulate points or some other unit of measurement that can then be used to enter a sweepstakes or other game of chance.

Based on the initiating, at block 410 an authentication interface is displayed, via a user interface of the player device, where the authentication interface is used to receive one or more authentication credentials. For example, the authentication interface may include a log-in web page or entry page that requires user identification and authentication. According to various embodiments, the player authentication credentials may include at least one credential selected from the group consisting of a username, a password, biometric information, and a security token. At block 415, player authentication credentials are received by the player device, and based thereon the player authentication credentials are authenticated to provide access to a player account of the player. According to one embodiment, the authentication process of the player authentication credentials include at least one form of authentication selected from the group consisting of password-based authentication, two factor authentication, multifactor authentication, biometric authentication, single sign-on (SSO) authentication, token based authentication, and certificate based authentication.

At block 420, the player device detects, via the interactive application, that the player has performed one or more actions to initiate retrieval of an outcome associated with one or more resources capable of being distributed to the player account of the player. According to one embodiment, the outcome indicates whether one or more resources are to be distributed to a player account of a player. The one or more actions may include the user selecting, via a user interface input control, a selectable icon to enter a sweepstakes. Various other non-limiting example user interface input controls may be used to provide the actions including selectable buttons, text fields, dropdown menus, radio buttons, checkboxes, links, tabs, toggles, sliders, etc. According to one embodiment, in order to enter the sweepstakes the player may be required to agree to various terms and conditions. In some embodiments, the actions may include in-game or real-world actions that makes it so that the user is automatically eligible or is automatically entered into the sweepstakes. For example, the player may be one of the first 500 players to reach a goal, which may make it so the player is automatically eligible to enter the sweepstakes without the user needing to affirmatively select anything via the user interface. Once the one or more actions have been performed, at block 425 a request is transmitted, via a computer network, to an enterprise server of the enterprise system in order to obtain the outcome, where the outcome is associated with a randomly generated number. According to one embodiment, the randomly generated number is based, at least in part, on a current amount of player points attributed to the player account, where the player points are earned by the player by playing the one or more computer games. For example, the player points may be earned by completing levels, by accomplishing goals, by merely engaging with the game, by engaging with the game over consecutive days, or by performing numerous other actions associated with one or more games and/or the interactive application in general.

At block 430, the outcome is received by the player device from the enterprise server and at block 435 an electronic communication is issued via the player device, where the electronic communication indicates results of the outcome. According to one embodiment, the electronic communication is selected from the group consisting of a push notification, a SMS text, an email notification, and an in-application notification accessible during the player's engagement with the interactive application. Advantageously, the electronic communication may include a link or otherwise facilitate redirecting the user to engage with the interactive application. This may help encourage customer engagement with the interactive application and help with customer retention. In some embodiments, the electronic communication further includes an interactive prompt prompting the player to play the one or more computer games again. For example, the electronic communication may indicate that the player may enter a new sweepstakes or other game of chance. According to various embodiments, results of the outcome may indicate whether the player will receive one or more resources that include virtual or currency rewards associated with a monetary value.

Figure 5:
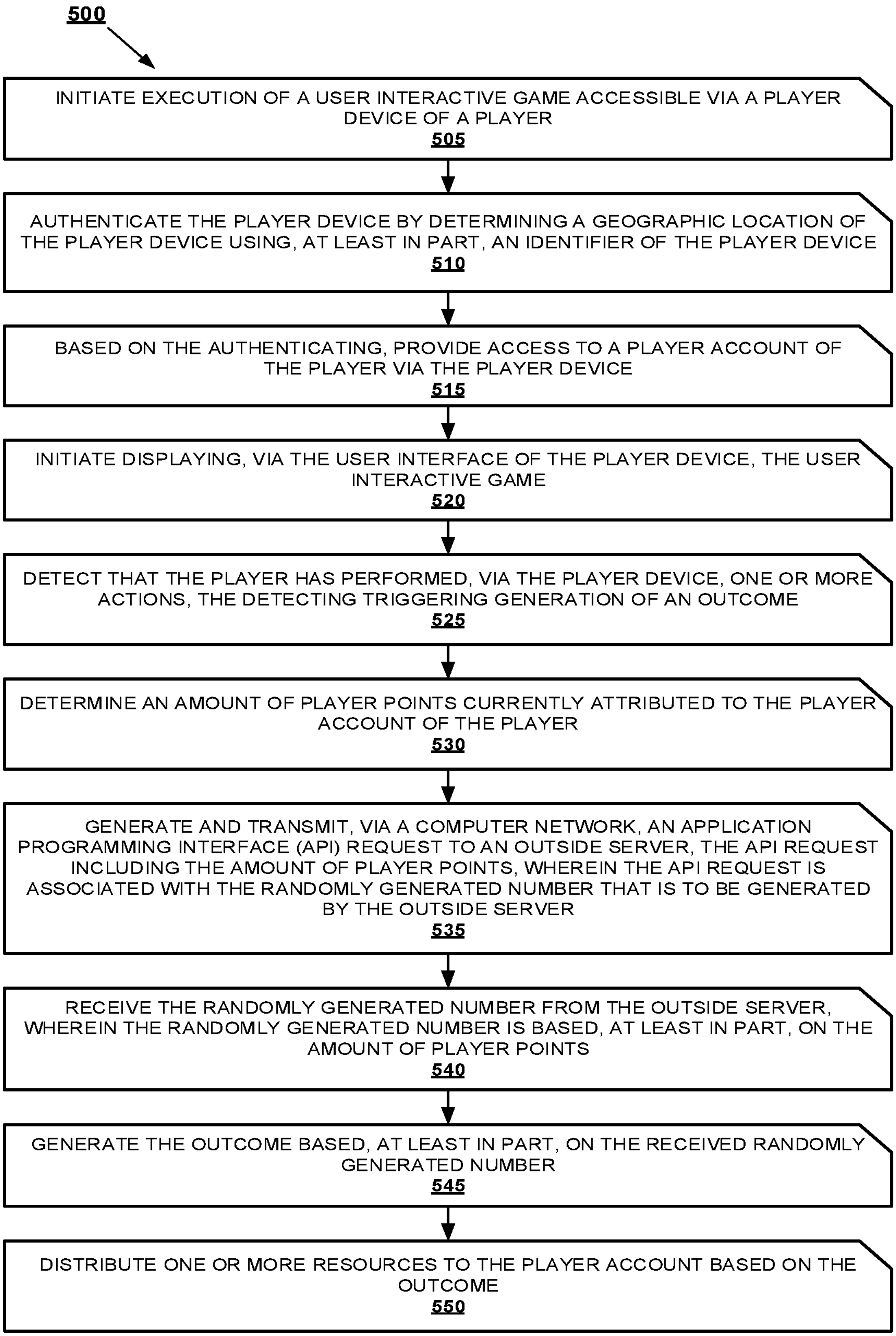
FIG. 5 depicts a block diagram of an example method for obtaining a randomly generated number, in accordance with an embodiment of the present invention.

FIG. 5 depicts a block diagram of an example method 500 for obtaining a randomly generated number, in accordance with an embodiment of the present invention. At block 505, an enterprise system initiates execution of a user interactive game accessible via a player device of a player. At block 510, the enterprise system authenticates the player device by determining a geographic location of the player device using, at least in part, an identifier of the player device. The identifier may include any one of the examples provided herein such as an IP address, a Wi-Fi and Bluetooth MAC address, a RFID, a Wi-Fi connection location, GPS, and/or GSM/CDMA cell IDs. For embodiments in which the identifier includes an IP address, the process of determining the geographic location of the player includes mapping the IP address of the player device using an IP geolocation API. At block 515, based on the authenticating access to a player account of the player is provided via the player device. At block 520, the enterprise system initiates displaying, via the user interface of the player device, the user interactive game, and at block 525 the enterprise system detects that the player has performed, via the player device, one or more actions, where the detecting triggers generation of an outcome. In some embodiments, the outcome may be generated in real time, whereas in other embodiments the outcome may be delayed due to the sweepstakes occurring on a certain date or after a threshold of entries for the sweepstakes have been reached.

At block 530, the enterprise system determines an amount of player points currently attributed to the player account of the player, and at block 535 the enterprise system generates and transmits, via a computer network, an API request to an outside server, where the API request includes the amount of player points. Further, the API request is associated with the randomly generated number that is to be generated by the outside server. For example, the API request may indicate that a randomly generated number is to be generated. At block 540, the randomly generated number is received from the outside server, where the randomly generated number is based, at least in part, on the amount of player points. At block 545 the enterprise system generates the outcome based, at least in part, on the received randomly generated number, and at block 550, the enterprise system distributes the one or more resources to the player account based on the outcome. According to one embodiment, the one or more resources that are distributed may include virtual or currency rewards associated with a monetary value.

Figure 6:
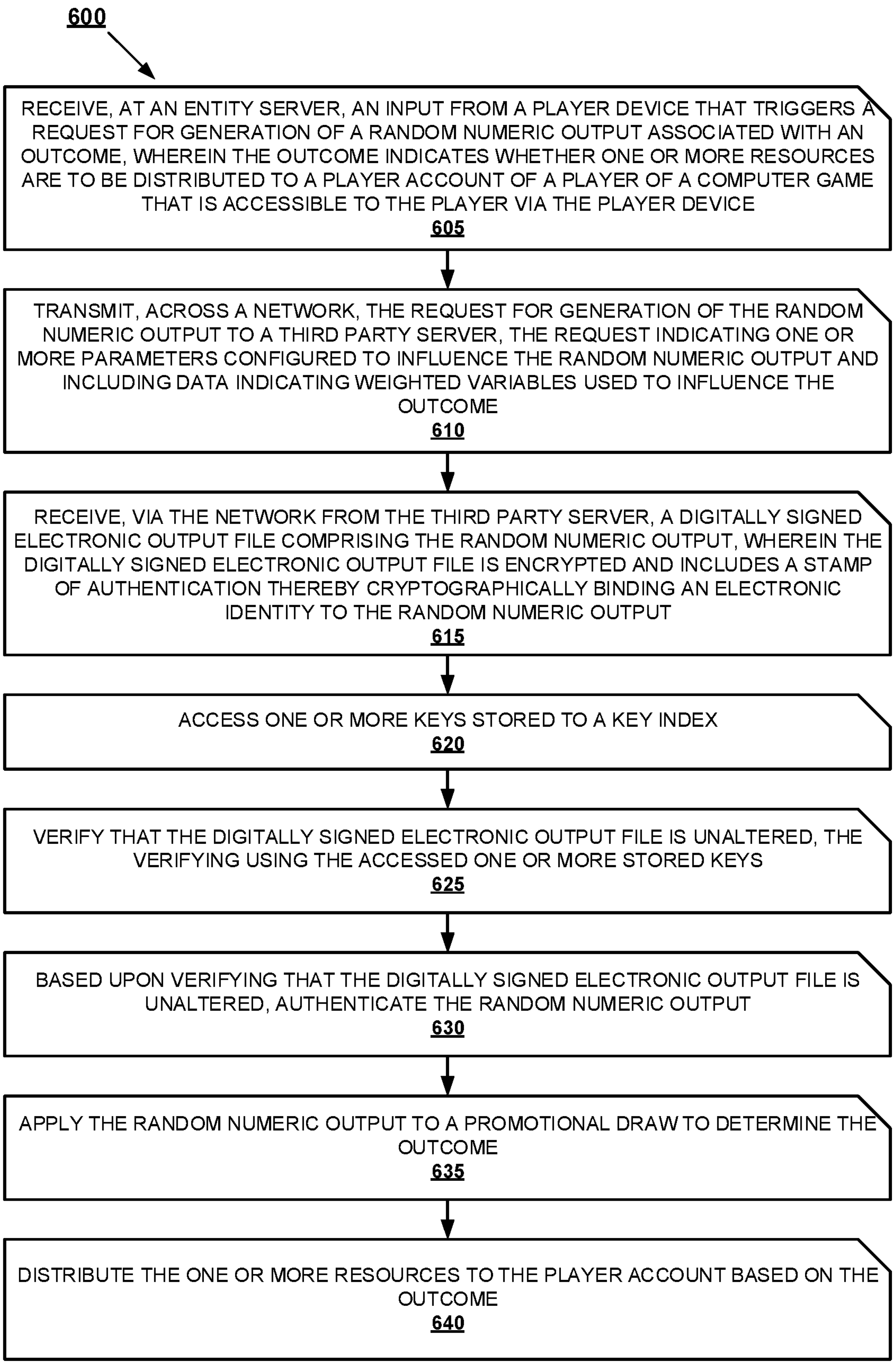
FIG. 6 depicts a block diagram of an example method for cryptographic data transmission, in accordance with an embodiment of the present invention.

FIG. 6 depicts a block diagram of an example method 600 for cryptographic data transmission, in accordance with an embodiment of the present invention. At block 605, an entity server receives an input from a player device that triggers a request for generation of a random numeric output associated with an outcome, wherein the outcome indicates whether one or more resources are to be distributed to a player account of a player of a gaming application that is accessible to the player via the player device. The entity server may include a server of a financial institution, according to one embodiment. The input may be triggered based on the player providing an indication, via one or more input controls displayed on a user interface of the player device, to enter a promotional draw such as a sweepstakes. The one or more resources can include real-world currency and the player account may include a financial account associated with a financial institution. At block 610, the request for generation of the random numeric output is transmitted across a network to a third party server. The third party server may be communicatively coupled to a random number generator (e.g., a TRNG, an HRNG, etc.) that uses an unpredicted physical variable. According to one embodiment, the request for generation of the random numeric output includes an API request. The transmitted request indicates one or more parameters configured to influence the random numeric output and include data indicating weighted variables used to influence the outcome. According to one embodiment, the weighted variables used to influence the outcome are predetermined prior to receiving the input, and the weighted variables include values affecting the probability of obtaining the one or more resources. In some examples, the weighted variables can include a current amount of player points already attributed to the player account. According to one or more embodiments, the one or more parameters include a quantity of random numbers included in the random numeric output, and the random numeric output includes a numeric combination of the quantity of random numbers. According to one embodiment, the random numeric output includes alphanumeric characters.

At block 615, a digitally signed electronic output file comprising the random numeric output is received via the network from the third party server, where the digitally signed electronic output file is encrypted and includes a stamp of authentication thereby cryptographically binding an electronic identity to the random numeric output. The digital signature may incorporate key cryptography using one or more keys that are stored to a key index accessible to the entity server and include a string of numbers and/or letters. In some embodiments, the digital signature may incorporate asymmetric cryptography in which separate keys are used for encrypting and decrypting the random numeric output. The one or more keys may be generated using, for example, a random bit generator. Accordingly, at block 620, one or more keys stored to a key index are accessed by the entity server and the entity server uses, at block 625 the accessed one or more stored keys to verify that the digitally signed electronic output file is unaltered. At block 630, based upon verifying that the digitally signed electronic output file is unaltered, the random numeric output is authenticated. At block 635, the random numeric output is applied to a promotional draw to determine the outcome, where the promotional draw includes, for example, a sweepstakes. At block 640, the one or more resources are distributed to the player account based on the outcome.

In some embodiments, the method 600 further includes authenticating, by the entity server, the player device, where the authenticating includes determining a geographic location of the player device from, at least in part, an identifier of the player device to ensure that the geographic location is a permitted geographic location, which indicates that the player is eligible to participate in the promotional draw to obtain the one or more resources. The identifier can include, according to one embodiment, an IP address, and determining the geographic location of the player includes mapping the IP address of the player device using an IP geolocation API.

In some embodiments, an alert is generated and transmitted to the player device, where the alert indicates the outcome. Further, the alert may include an electronic communication selected from the group consisting of a push notification, a SMS text, an email notification, and an in-application notification accessible during the player's engagement with the gaming application.

Figure 7:
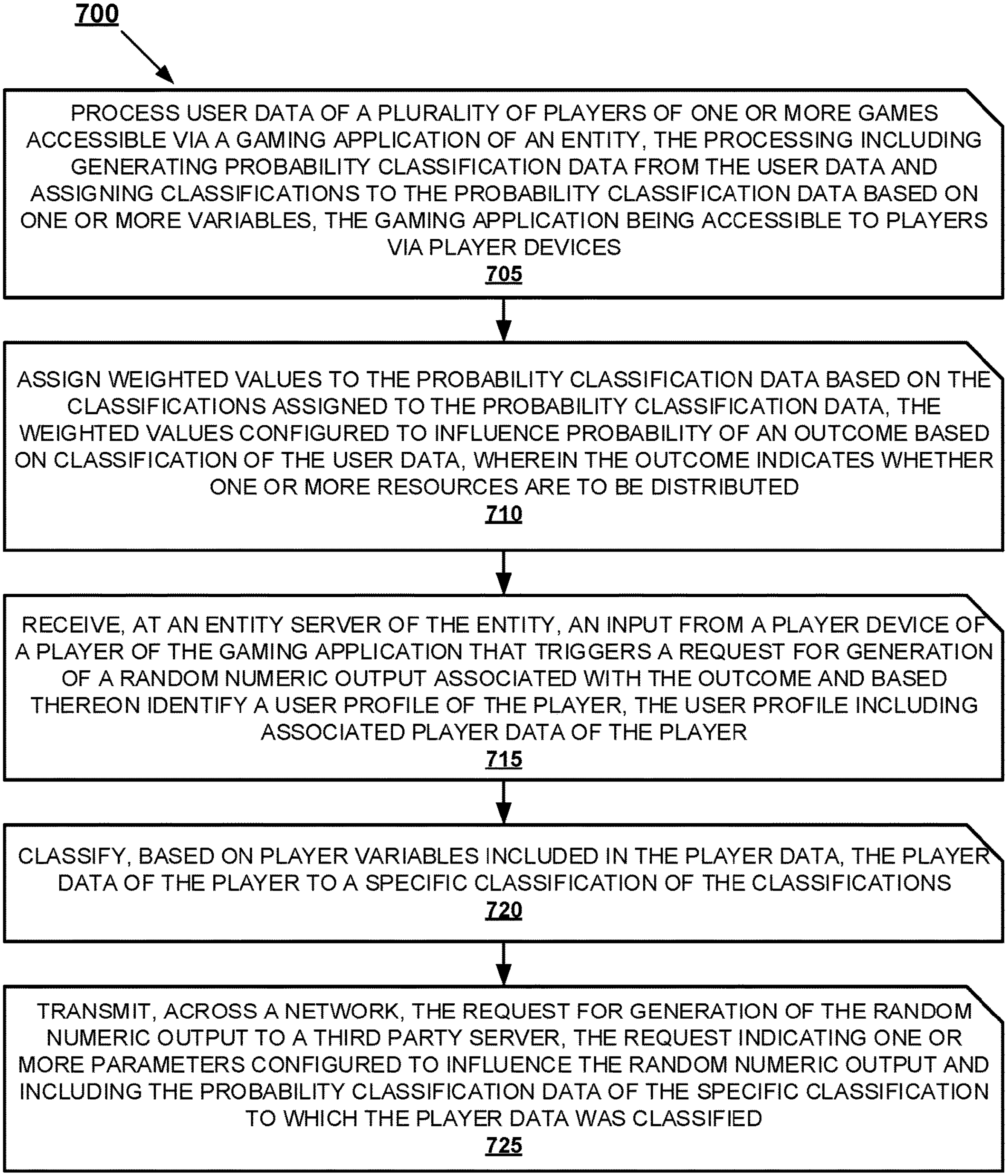
FIG. 7 depicts a block diagram of an example method for variable assignment, in accordance with an embodiment of the present invention.

FIG. 7 depicts a block diagram of an example method 700 for variable assignment, in accordance with an embodiment of the present invention. At block 705, user data of a plurality of players of one or more games accessible via a gaming application of an entity is processed, where the processing includes generating probability classification data from the user data and assigning classifications to the probability classification data based on one or more variables. The gaming application is accessible to the players via the player devices. At block 710, weighted values are assigned to the probability classification data based on the classifications assigned to the probability classification data, where the weighted values are configured to influence the probability of an outcome based on classification of the user data. Further, the outcome indicates whether one or more resources are to be distributed.

At block 715, an entity server of the entity receives an input from a player device of a player of the gaming application, where receipt of the input triggers a request for generation of a random numeric output associated with the outcome and based on receiving the input a user profile of the player is identified, where the user profile includes associated player data of the player. At block 720, based on player variables included in the player data, the player data of the player is classified to a specific classification of the classifications. At block 725, the request for generation of the random numeric output is transmitted to a third party server, where the request indicates one or more parameters configured to influence the random numeric output and includes the probability classification data of the specific classification to which the player data was classified. According to some embodiments, the request for generation of the random numeric output includes an API request.

According to various embodiments, the method 700 also includes receiving, via the network from the third party server, a digitally signed electronic output file comprising the random numeric output, wherein the digitally signed electronic output file is encrypted and includes a stamp of authentication thereby cryptographically binding an electronic identity to the random numeric output. One or more keys stored to a key index are accessed the method 700 includes verifying that the digitally signed electronic output file is unaltered, where the verifying uses the accessed one or more stored keys. Based upon verifying that the digitally signed electronic output file is unaltered, the random numeric output is authenticated, and the random numeric output is applied to a promotional draw to determine the outcome. Further, the one or more resources are distributed to the player account based on the outcome.

In some embodiments, the method 700 includes initiating displaying, via a user interface of the player device of the player, an indication of the output. In some embodiments, the entity server authenticates the player device, where the authenticating includes determining a geographic location of the player device from, at least in part, an identifier of the player device to ensure that the geographic location is a permitted geographic location so that the player is eligible to participate in a promotion to obtain the one or more resources. In some embodiments, the identifier includes an IP address and determining the geographic location of the player includes mapping the IP address of the player device using an IP geolocation API.

In some embodiments, the method 700 includes generating and transmitting an alert to the player device, where the alert indicates the outcome, and where the alert is selected from the group consisting of a push notification, a SMS text, an email notification, and an in-application notification accessible during the players engagement with the gaming application.

Computer program instructions are configured to carry out operations of the present invention and may be or may incorporate assembler instructions, instruction-set-architecture (ISA) instructions, machine instructions, machine dependent instructions, microcode, firmware instructions, state-setting data, source code, and/or object code written in any combination of one or more programming languages.

An application program may be deployed by providing computer infrastructure operable to perform one or more embodiments disclosed herein by integrating computer readable code into a computing system thereby performing the computer-implemented methods disclosed herein.

Although various computing environments are described above, these are only examples that can be used to incorporate and use one or more embodiments. Many variations are possible.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to explain the principles of one or more aspects of the invention and the practical application thereof, and to enable others of ordinary skill in the art to understand one or more aspects of the invention for various embodiments with various modifications as are suited to the particular use contemplated.

It is to be noted that various terms used herein such as "Linux®," "Windows®," "macOS®," "iOS®," "Android®," and the like may be subject to trademark rights in various jurisdictions throughout the world and are used here only in reference to the products or services properly denominated by the marks to the extent that such trademark rights may exist.

What is claimed is:

1. A computing system for cryptographic data transmission, the computing system comprising:

at least one processor;

a communication interface communicatively coupled to the at least one processor; and a memory device storing executable code that, when executed, configures the at least one processor to:

receive via a communication network, at an entity server, an input from a player device;

trigger, upon receiving the input, a request for generation of a random numeric output associated with an outcome, wherein the outcome indicates whether one or more resources are to be distributed to a player account associated with and accessible via the player device;

wherein to trigger, upon receiving the input, the request for generation of a random numeric output, the at least one processor is configured to transmit, across the communication network, the request for generation of the random numeric output to a third party server, the request for generation of the random numeric output indicating one or more parameters configured to influence the random numeric output and including data indicating weighted variables used to influence the outcome;

receive, via the communication network from the third party server, a digitally signed electronic output file comprising the random numeric output, wherein the digitally signed electronic output file is encrypted and includes a stamp of authentication thereby cryptographically binding an electronic identity to the random numeric output;

access one or more keys stored in a key index;

verify that the digitally signed electronic output file is unaltered, the verifying using the accessed one or more stored keys thereby authenticating the random numeric output;

determine the outcome using the random numeric output; and distribute the one or more resources to the player account based on the outcome.

2. The computing system of claim 1, wherein the weighted variables used to influence the outcome are predetermined prior to receiving the input, and the weighted variables include values affecting probability of obtaining the one or more resources.

3. The computing system of claim 1, wherein the one or more parameters include a quantity of random numbers included in the random numeric output, and the random numeric output includes a numeric combination of the quantity of random numbers.

4. The computing system of claim 1, wherein the executable code, when executed, further configures the at least one processor to authenticate, by the entity server, the player device, wherein the authenticating includes determining a geographic location of the player device from, at least in part, an identifier of the player device to ensure that the geographic location is a permitted geographic location so that the player is eligible to participate in a promotional draw to obtain the one or more resources.

5. The computing system of claim 4, wherein the identifier comprises an Internet Protocol (IP) address, and wherein determining the geographic location of the player comprises mapping the IP address of the player device using an IP geolocation API.

6. The computing system of claim 1, wherein the weighted variables include a current amount of player points already attributed to the player account.

7. The computing system of claim 1, wherein the request for generation of the random numeric output comprises an API request.

8. The computing system of claim 1, wherein the executable code, when executed, further causes the at least one processor to generate and transmit an alert to the player device, wherein the alert indicates the outcome.

9. The computing system of claim 8, wherein the alert comprises an electronic communication selected from the group consisting of a push notification, a SMS text, an email notification, and an in-application notification accessible during engagement of the player device with a gaming application.

10. A computing system for variable assignment, the computing system comprising:

at least one processor;

a communication interface communicatively coupled to the at least one processor; and a memory device storing executable code that, when executed, configures the at least one processor to:

process user data players of regarding one or more games accessed via a gaming application of an entity, the processing including generating probability classification data from the user data and assigning classifications to the probability classification data, the gaming application being accessible via player devices;

assign weighted values to the probability classification data based on the assigned classifications, the weighted values configured to influence probability of an outcome based on classification of the user data, wherein the outcome indicates whether one or more resources are to be distributed;

receive via a communication network, at an entity server of the entity, an input from a player device;

trigger, upon receiving the input from the player device, a request for generation of a random numeric output associated with the outcome and based thereon identify a user profile associated with the player device, the user profile including associated player data;

classify, based on player variables included in the player data, the player data to a specific classification of the classifications;

transmit, across the communication network, the request for generation of the random numeric output to a third party server, the request indicating one or more parameters configured to influence the random numeric output and including the probability classification data of the specific classification to which the player data was classified;

receive, via the communication network from the third party server, a digitally signed electronic output file comprising the random numeric output, wherein the digitally signed electronic output file is encrypted and includes a stamp of authentication thereby cryptographically binding an electronic identity to the random numeric output;

access one or more keys stored in a key index;

verify that the digitally signed electronic output file is unaltered, the verifying using the accessed one or more stored keys;

based upon verifying that the digitally signed electronic output file is unaltered, authenticate the random numeric output;

determine the outcome using the random numeric output;

generate and transmit an alert to the player device, wherein the alert indicates the outcome; and distribute the one or more resources based on the outcome to a player account indicated by the player data.

11. The computing system of claim 10, wherein the executable code, when executed, further causes the at least one processor to initiate displaying, via a user interface of the player device, an indication of the output.

12. The computing system of claim 10, wherein the executable code, when executed, further causes the at least one processor to authenticate, by the entity server, the player device, wherein the authenticating includes determining a geographic location of the player device from, at least in part, an identifier of the player device to ensure that the geographic location is a permitted geographic location for a promotion to obtain the one or more resources.

13. The computing system of claim 12, wherein the identifier comprises an Internet Protocol (IP) address, and wherein determining the geographic location of the player device comprises mapping the IP address of the player device using an IP geolocation API.

14. The computing system of claim 10, wherein the request for generation of the random numeric output comprises an API request.

15. The computing system of claim 10, wherein the alert is selected from the group consisting of a push notification, a SMS text, an email notification, and an in-application notification accessible via the gaming application.

16. A computer-implemented method for cryptographic data transmission, comprising:

receiving across a communication network, at an entity server, an input from a player device that triggers a request for generation of a random numeric output associated with an outcome, wherein the outcome indicates whether one or more resources are to be distributed to a player account by which a gaming application is accessible via the player device;

transmitting, across the communication network, the request for generation of the random numeric output to a third party server, the request indicating one or more parameters configured to influence the random numeric output and including data indicating weighted variables used to influence the outcome;

receiving, via the communication network from the third party server, a digitally signed electronic output file comprising the random numeric output, wherein the digitally signed electronic output file is encrypted and includes a stamp of authentication thereby cryptographically binding an electronic identity to the random numeric output;

accessing one or more keys stored in a key index;

verifying that the digitally signed electronic output file is unaltered, the verifying using the accessed one or more stored keys thereby authenticating the random numeric output;

determining the outcome using the random numeric output;

generating and transmitting an alert to the player device, wherein the alert indicates the outcome; and distributing the one or more resources to the player account based on the outcome.

17. The computer-implemented method of claim 16, wherein the method further comprises authenticating, by the entity server, the player device, wherein the authenticating includes determining a geographic location of the player device from, at least in part, an identifier of the player device to ensure that the geographic location is a permitted geographic location for a promotion to obtain the one or more resources.

18. The computer-implemented method of claim 17, wherein the identifier comprises an Internet Protocol (IP) address, and wherein determining the geographic location of the player device comprises mapping the IP address of the player device using an IP geolocation API.

* * * * *